(12) United States Patent
Drechsel (10) Patent No.: US 11,717,838 B2
(45) Date of Patent: Aug. 8, 2023

(54) PRESSURE REGULATOR FOR A LIQUID

(71) Applicant: Arno Drechsel, Lienz (AT)

(72) Inventor: Arno Drechsel, Lienz (AT)

(73) Assignee: Komet Austria GmbH, Lienz (AT)

( * ) Notice: Subject to any disclaimer, the term of this patent is extended or adjusted under 35 U.S.C. 154(b) by 0 days.

(21) Appl. No.: 17/365,944

(22) Filed: Jul. 1, 2021

(65) Prior Publication Data

US 2022/0371032 A1 Nov. 24, 2022

(30) Foreign Application Priority Data

May 18, 2021 (IT) .......................... 102021000012803

(51) Int. Cl.
*B05B 1/30* (2006.01)
*A01G 25/16* (2006.01)

(52) U.S. Cl.
CPC .......... *B05B 1/3073* (2013.01); *B05B 1/3006* (2013.01); *A01G 25/16* (2013.01)

(58) Field of Classification Search
CPC ..... B05B 1/3073; B05B 1/3006; A01G 25/16; G05D 16/0655
USPC .................................................... 137/505.25
See application file for complete search history.

(56) References Cited

U.S. PATENT DOCUMENTS

| | | | | |
|---|---|---|---|---|
| 4,543,985 A * | 10/1985 | Healy | ............... | G05D 16/0655 137/505.21 |
| 5,881,757 A * | 3/1999 | Kuster | ............... | G05D 16/0608 137/454.2 |
| 6,374,853 B1 * | 4/2002 | Callies | ............... | G05D 16/0608 137/505.25 |
| 8,714,186 B2 * | 5/2014 | Ungerecht | ......... | G05D 16/0655 137/505.28 |
| 2012/0285561 A1 * | 11/2012 | Lawyer | .............. | G05D 16/0608 137/561 R |
| 2015/0293539 A1 * | 10/2015 | Greenwood | ....... | G05D 16/0608 137/505.28 |

* cited by examiner

*Primary Examiner* — Patrick C Williams
(74) *Attorney, Agent, or Firm* — Themis Law (57) ABSTRACT

A liquid pressure regulator includes a housing having an inlet portion and an outlet portion, a tubular valve member slidingly accommodated inside the housing and having an inlet edge, a valve body fixed inside the housing and a seat that interacts with the inlet edge to form a port having a variable width, and an elastic annular diaphragm for connecting the valve member to the housing and forming a regulating chamber. The valve member has an outlet edge configured to interact with the outlet portion of the housing and form an annular passage communicating with the regulating chamber. The width of the annular passage decreases as the inlet edge of the valve member moves toward the seat. The outlet portion has a wider region with a transverse surface defining the bottom of the regulating chamber, which is inclined toward the center to facilitate the outer discharge of soil, sand and impurities.

14 Claims, 4 Drawing Sheets

PRESSURE REGULATOR FOR A LIQUID

FIELD OF THE INVENTION

The present invention generally finds application in the field of irrigation systems for agricultural and industrial applications, and particularly relates to a liquid pressure regulator, particularly designed to be installed in irrigation systems or the like.

In a second aspect, the invention relates to a method of operating the aforementioned pressure regulator.

BACKGROUND OF THE INVENTION

Agricultural and/or industrial irrigation systems are known in the art, which comprise a liquid supply line connected to a plurality of sprinkler devices for distributing a jet of such liquid to a soil portion to be irrigated or cooled.

One requirement of these known systems is to distribute a substantially constant amount of liquid to a given soil portion, to irrigate or cool it in an approximately uniform manner.

The sprinkler devices may be either stationary, to always distribute the liquid over the same soil portion, or movable relative to the supply conduit for substantially constant-speed sweeping of a given cultivated surface.

Almost all the sprinklers for use in irrigation systems afford jet nozzle selection to adapt liquid distribution to the needs of the particular soil or crop.

Nevertheless, uniform liquid distribution requires a substantially constant jet pressure, regardless of the nozzle that is mounted to the sprinkler.

For this purpose, a pressure regulator connected to the supply line is typically installed upstream from the nozzle, with liquid having a relatively constant pressure value, which is set according to the nominal pressure selected by the user.

A typical regulator has a housing with a stationary valve seat therein and a movable tubular valve member which has an inlet edge adapted to interact with the valve seat to define a pressure regulating port.

The valve member is equipped with an annular diaphragm defining a liquid regulating chamber with the housing to move the valve member and vary the regulating port based on the liquid pressure, to maintain this pressure substantially constant.

U.S. Pat. No. 7,048,001 discloses a pressure regulating device as described hereinbefore. The axis of the valve seat and the axis of the inlet and outlet ports are inclined to each other to reduce the risk that grass or other materials may block the movement of the valve stem, thereby causing sudden pressure drops.

In addition, the valve seat is joined to the housing by a single strut to reduce liquid flow resistance.

One drawback of this known regulator is that impurities such as grass, soil, sand, debris or the like in the irrigation liquid may build up in the regulating chamber during operation and may even hinder the movement of the valve body.

A further drawback of this known regulator is that due to the axis offset, the valve body is impinged upon by the flow on one side, resulting in greater wear of the elements and seals on the inlet side of the valve body and water leakage and malfunctioning in regulation.

U.S. Pat. No. 10,386,867 by the Applicant hereof discloses a pressure regulating device, also as described hereinbefore, in which the liquid flow at the outlet has a substantially constant pressure under all operating conditions.

In this regulator the axis of the valve seat is offset but parallel to that of the valve member and to that of the end fittings of the housing. In addition, the valve seat is joined to the housing by a pair of struts, whereby the seat is stronger and more resistant to pressure changes acting on the regulator. Furthermore, the regulator does not require composite and reinforced materials.

This configuration improves the liquid flow conditions along the walls of the housing and reduces the risk that impurities may be retained in the liquid. Nevertheless, the transverse offsets of all the parts of the structure add to the complexity and costs of the manufacturing process.

One problem of all these known regulators is that during operational transients of the irrigation system, especially at system start-up, water hammers may occur which may cause vibrations in the regulator and damage the regulator and the system as a whole.

Certain types of regulators sometimes use seals that form small by-passes for the pressurized liquid to limit liquid entry into the regulating chamber, thereby hindering and almost preventing automatic discharge of the residues in the regulating chamber to the outside.

While these regulating devices have a simplified structure and greater strength than known devices of the prior art, they are still exposed to vibrations and water hammers and can be susceptible to further improvement.

Technical Problem

In view of the prior art, the technical problem addressed by the invention is deemed to consist in reducing vibrations and water hammers and simplifying removal of any sand and debris in the irrigation liquid.

SUMMARY OF THE INVENTION

The object of the present invention is to solve the aforementioned technical problem and obviate the above discussed drawback, by providing a pressure regulator that is highly efficient and relatively cost-effective.

A particular object of the present invention is to provide a pressure regulator that can further reduce the risk of vibrations and occurrence of water hammers.

A particular object of the present invention is to provide a pressure regulator that can maintain a substantially constant pressure value through all conditions of use.

A particular object of the present invention is to provide a pressure regulator that facilitates drainage and discharge of any soil, sand and debris building up in the regulating chamber at the end of the operation.

A particular object of the present invention is to provide a pressure regulator that has a relatively simplified structure as compared to those of the prior art having the same fluid-dynamic properties.

These and other objects, as more clearly shown hereinafter, are fulfilled by a liquid pressure regulating device as defined in claim 1, which comprises a valve member with an upstream end having an inlet edge, a valve body having a seat adapted to interact with said inlet edge of the valve member to create a port having a variable width, an elastic annular diaphragm adapted to connect said valve member to said housing to form therewith a regulating chamber, said valve member having one downstream end with a liquid outlet edge configured to interact with the liquid outlet portion and form therewith an annular passage in communication with said regulating chamber, wherein the width of said annular passage is variable and decreases as the inlet edge of said valve member moves toward said valve seat.

Due to this annular passage, the flow of the liquid directed toward the regulating chamber by the back pressure generated in the outlet portion by a nozzle or by a delivery device downstream from the regulator is laminated and retained by friction in the annular passage, thereby damping the entry of the liquid into the regulating chamber and avoiding any sudden pressure changes, vibrations and water hammers.

In one embodiment, the outlet edge of the valve member has a first outer annular projection having a first diameter, and the outlet portion of the housing has a second inner annular projection with a second diameter, which is slightly greater than the first diameter, the width of the annular passage being given by the difference of said inner and outer diameters and by the position of said first annular projection relative to said second annular projection.

Conveniently, the valve member is movable between a maximum open position when its inlet edge is at the maximum distance from the valve seat, and a minimum open position with its inlet edge at the minimum distance from the valve seat, which is always other than zero.

With this movement of the valve member the size of the port between the inlet edge and the valve seat may be adjusted to regulate the pressure of the liquid between a maximum value and a minimum value, without entirely blocking the liquid passage. This is because the regulator is not a valve but a pressure regulator that will always allow liquid to flow.

Advantageously, the annular passage has a maximum value with the valve member in the maximum open position in which the first annular projection and the second annular projection are totally axially offset to define a gap of approximately constant maximum width therebetween.

In addition, the annular passage has a minimum value with the annular member in the minimum open position in which the first annular projection and the second annular projection are in a fully overlapping position to define a gap of minimum width therebetween, which is suitable to reduce the liquid flow in the regulating chamber and prevent the occurrence of vibrations and water hammers in such chamber.

In one embodiment, the outlet portion of the housing has a wider region with an annular transverse surface defining the bottom of the regulating chamber.

Conveniently, the annular transverse surface defining the bottom surface of the regulating chamber is inclined toward the center, to convey any sand and impurities in the liquid collected in the regulating chamber toward the outlet and to facilitate discharge thereof to the outside, especially at the end of the operation of the regulator when the valve member is pushed to its maximum open position.

Advantageous embodiments of the invention are obtained in accordance with the dependent claims.

BRIEF DESCRIPTION OF THE DRAWINGS

Further features and advantages of the invention will be more apparent from the detailed description of a preferred, non-exclusive embodiment of a liquid pressure regulator of the invention, which is described as a non-limiting example with the help of the annexed drawings, in which.

DETAILED DESCRIPTION OF EMBODIMENTS OF THE INVENTION

Particularly referring to the above figures, a liquid pressure regulator of the invention is described, which is generally referenced 1.

As a non-limiting example, the regulator 1 may be installed in irrigation systems for uniform distribution of a liquid, e.g., water, over a predetermined area to be irrigated or cooled, not shown.

As used hereinafter, the term "upstream" refers to a backward position with respect to the direction of the liquid flow through the regulator and the term "downstream" refers to a forward position with respect to the direction of the flow through the regulator.

The regulator device 1 may be installed upstream from one or more sprinklers with nozzles, not shown, for the jet of liquid to be delivered at a substantially constant pressure, substantially irrespective of the size of the delivery nozzles that are mounted to the sprinklers.

"Substantially" indicates possible deviations from =5% to −5%.

The pressure regulator 1 of the invention generally comprises a housing 2 defining a longitudinal axis L and having an inlet portion 3 and an outlet portion 4 for the liquid; with respective internally threaded inlet 5 and outlet fittings 6 for connection to a liquid supply line and to a sprinkler, both not shown, with the flow direction being designated by arrows IN and OUT, respectively.

In the embodiment as shown in the figures, the housing 2 is hollow and defines an interior passage 7 which extends between the inlet fitting 5 and the outlet fitting 6.

The end portions 3, 4 may have a slightly flared shape with respective connecting flanges 8, 9 having holes 10 for removable connection, for example by means of screws 11.

Figure 1:
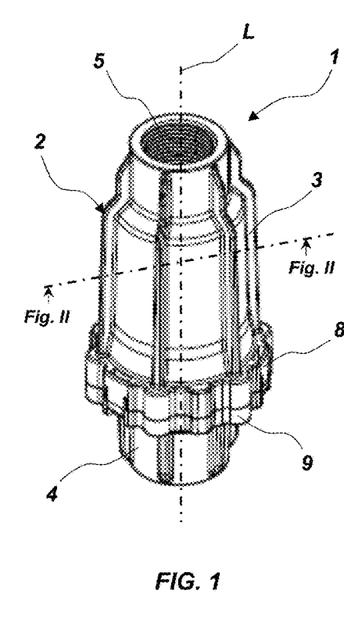
FIG. 1 is a perspective view of a pressure regulator of the invention.
Figure 2:
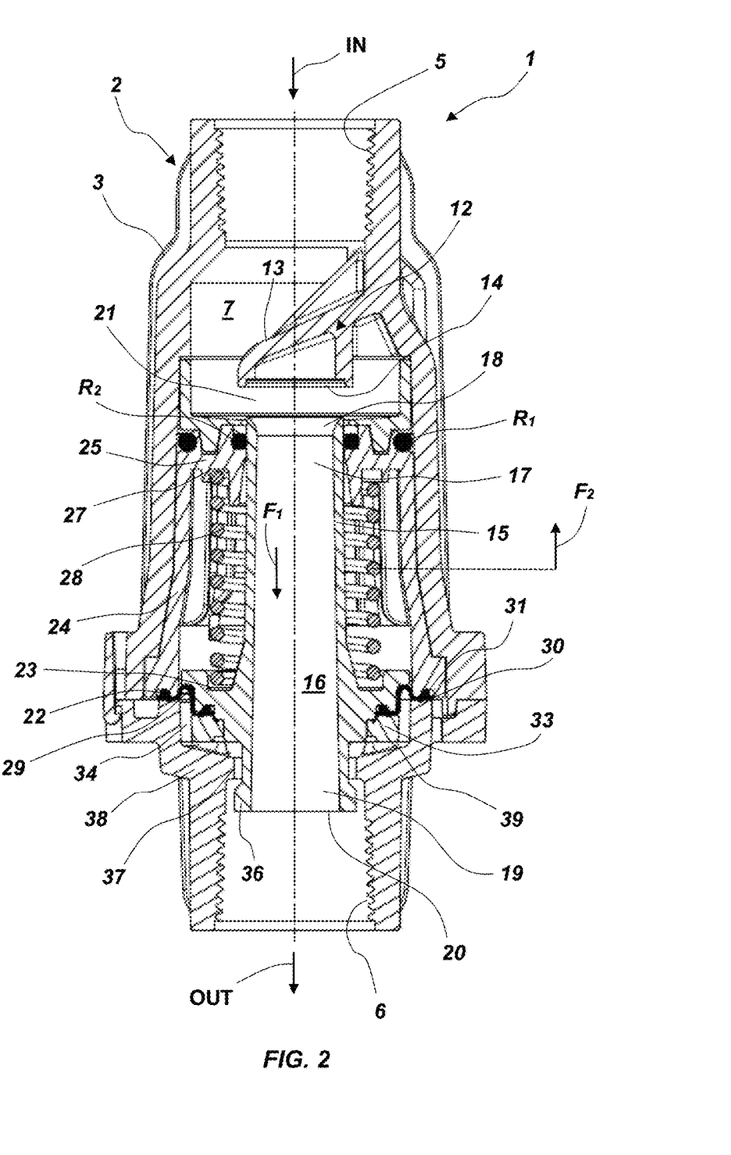
FIG. 2 is a partially broken away side view of the regulator of FIG. 1 as taken along an axial diametral plane.
Figure 3:
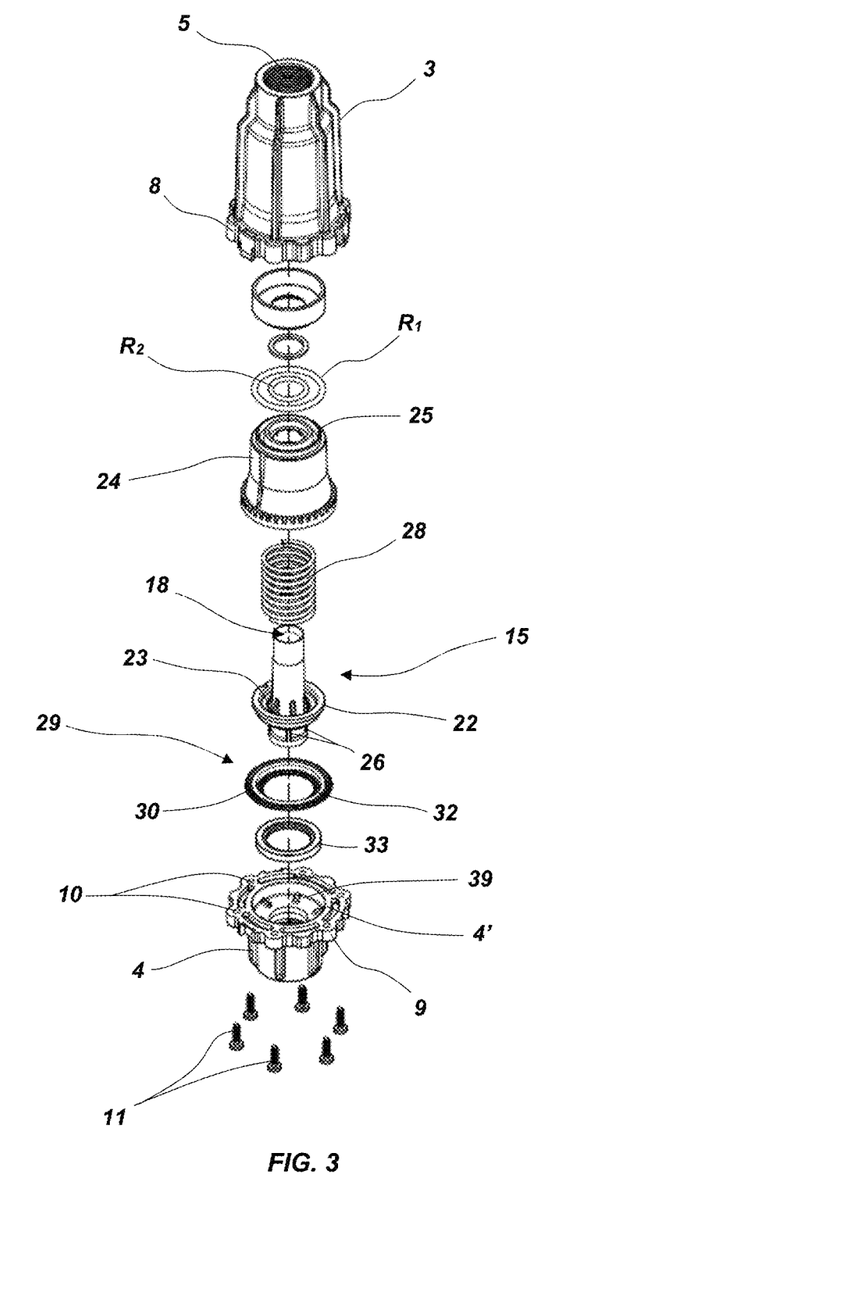
FIG. 3 is an exploded perspective view of the regulator of FIG. 1.

As clearly shown in FIG. 2, a stationary valve body 12 is provided inside the compartment 7 of the housing 2 and has a curved surface 13 inclined toward the outlet and an opposite substantially flat surface perpendicular to the longitudinal axis L defining a valve seat 14.

The interior passage 7 houses a tubular valve member 15 with a central passage 16, which is able to slide in two directions along the axis L.

The valve member 15 has an upstream end 17 with an inlet edge 18 for the liquid and a downstream end 19 with an outlet edge 20 from which the liquid exits after passing through the central passage 16.

The seat 14 of the valve body 12 is configured to interact with the inlet edge 18 of the valve member 15 and define a port 21 therewith for the passage of the liquid in response to the flow demand by the nozzle or distributor downstream from the regulator.

Toward its downstream end 19, the valve member 15 has a flange 22 with an annular groove 23 facing the inlet fitting 5.

In addition, a sleeve 24 is inserted between the valve member 15 and the inner surface of the housing 2 and has a collar 25 near its upper end with a calibrated central hole having the function to guide the valve member 15.

In order to ensure a perfectly axial movement of the valve member 15, longitudinal ribs 26 of calibrated thickness are formed on the outer surface of its downstream end 19.

An annular groove 27 is formed on the face of the collar 25 that faces the outlet fitting 6 and two annular grooves are formed on the opposite face to accommodate respective O-rings $R_1$ and $R_2$ forming a seal with respect to the inlet portion 3 of the housing 2.

A helical spring 28 is provided in a peripheral position with respect to the valve member 15, with ends accommodated in the groove 23 of the flange 22 and in the groove 27 of the collar 25 respectively, to bias the valve member 15 toward the outlet fitting 6 with a calibrated force $F_1$ directed toward the outlet fitting 6, as determined by the elastic constant of the spring 28 and defining nominal pressure at the outlet of the regulator, which is substantially constant regardless of the diameter of the downstream nozzle or liquid delivery device.

The valve member 15 is connected to the housing 2 by an annular diaphragm 29, having an outer peripheral portion 30 clamped between the bottom edge 31 of the sleeve 23 and the top edge 4' of the outlet portion 4 of the housing, and an inner peripheral portion 32 clamped between the flange 22 and a locking ring 33.

The diaphragm 29 defines a seal and forms a regulating chamber 34 with the outlet portion 4 of the housing.

The back pressure generated by a nozzle or delivery device downstream from the regulator 1 causes the liquid in the outlet fitting 6 to rise toward the regulating chamber 34, which increases its volume and acts on the flange, by biasing the valve member 15 toward the seat 14 with a force $F_2$ directed toward the inlet fitting 5 that is greater than the force $F_1$ of the spring 28.

As a result, the regulating chamber 34 with its annular diaphragm 29 will cause the longitudinal translation of the valve member 15 to move its inlet edge 18 toward the seat 14 of the valve body 12.

Figure 4A:
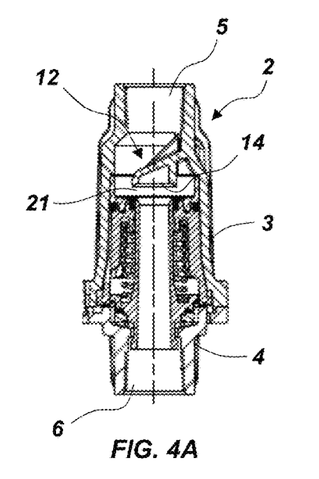
FIG. 4A is a partially broken away view of the regulator of FIG. 2 in a fully-open first operating step.
Figure 4B:
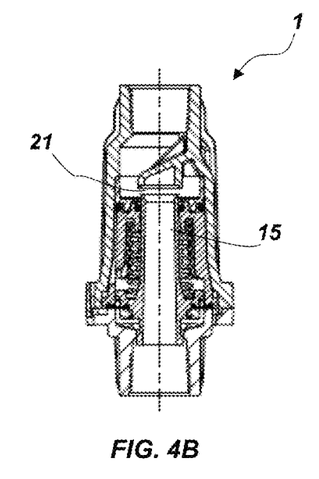
FIG. 4B is a partially broken away view of the regulator of FIG. 2 in a maximum-flow second operating step.
Figure 4C:
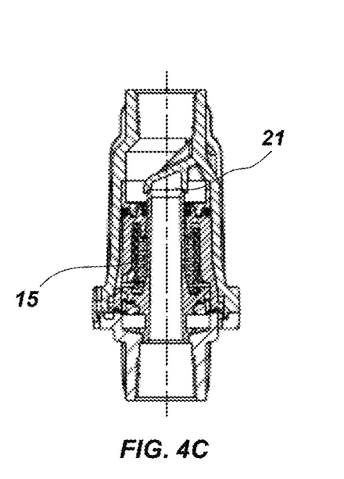
FIG. 4C is a partially broken away view of the regulator of FIG. 2 in a minimum-flow third operating step.
Figure 5A:
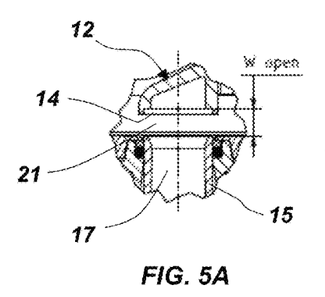
FIG. 5A is a view of a detail of FIG. 2 in the first operating step of FIG. 4A.
Figure 5B:
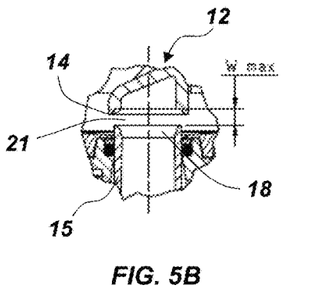
FIG. 5B is a view of the detail of FIG. 5A in the second operating step of FIG. 4B.
Figure 5C:
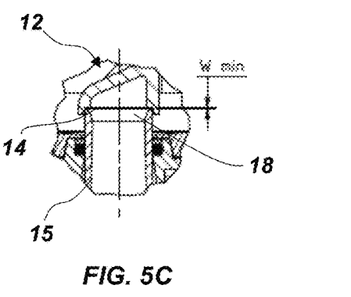
FIG. 5C is a view of the detail of FIG. 5A in the third operating step of FIG. 4C.

Thus, the valve member 15 will be moved between a fully open position in which its inlet edge 18 is at the maximum distance from the valve seat 14, as shown in FIGS. 4A and 5A, and a minimum open position in which the inlet edge 18 is at the minimum distance from the valve seat 14, as shown in FIGS. 4C and 5C.

In particular, in the fully open position, the edge 18 is at a distance designated $W_{open}$, in which the port 21 has the maximum width allowed by the geometry of the regulator; in the position of the edge 18 at the distance $W_{max}$, the flow through the valve member 15 is the maximum allowed by the regulator with a flow rate $Q_{max}$, whereas in the position of the edge 18 at the distance $W_{min}$ the flow through the valve member 15 is the minimum at a flow rate $Q_{min}$. It shall be noted that in the latter position the port $W_{min}$ may be very small but never equal to zero, since the regulator is not a tap that intercepts the flow but a regulator that only regulates the pressure.

According to the invention, the outlet edge 20 of the downstream end 19 of the valve member 15 is configured to interact with the outlet portion 4 of the liquid and form therewith an annular passage 35 having a variable width.

In particular, the annular passage 35 decreases as the inlet edge 18 of the valve member 15 moves toward the seat 14 to reduce the liquid flow toward the regulating chamber 34 and avoid sudden pressure changes and water hammers.

These events occur when the regulating chamber 34 is filled too quickly, such as when the system is operated, that is when the liquid begins to flow to the regulator.

If the liquid enters the regulating chamber 34 too abruptly, the valve member 15 is instantaneously biased toward the valve seat 14, thereby abruptly closing the liquid passage 35.

Now, the pressure downstream of the valve seat 14 drops, the spring 28 biases the valve member 15 toward the outlet fitting 6. As a result, the width of the port 21 between the seat 14 and the inlet edge 18 of the valve member 15 opens again and the cycle is repeated, thereby triggering continuous vibration.

These events may be substantially eliminated by reducing the inlet flow rate of the liquid into the regulating chamber 34 through the narrow annular passage 35.

For this purpose, the outlet edge 20 of the valve member 15 has a first outer annular projection 36 having a first inner diameter $D_1$, whereas the outlet portion 4 of the housing 2 has a second inner annular projection 37 having a second outer diameter D2 which is slightly greater than the first diameter $D_1$.

The annular passage 35 has a width Δ determined by the difference between the inner diameter $D_1$ and the outer diameter D2 as well as by the position of the first annular projection 36 relative to the second annular projection 37.

Figure 6A:
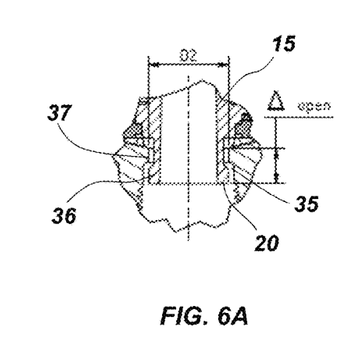
FIG. 6A is a view of a further detail of FIG. 2 in the first operating step of FIG. 4A.
Figure 6B:
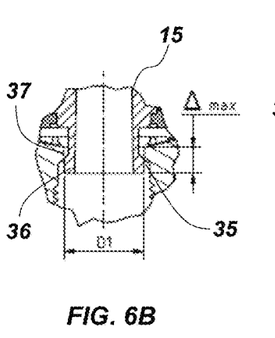
FIG. 6B is a view of the detail of FIG. 6A in the second operating step of FIG. 4B.

The width Δ of the annular passage 35 has a maximum value $\Delta_{max}$ when the valve member 15 in in its maximum open position, in which the first annular projection 36 and the second annular projection 37 are totally axially offset, as shown in FIG. 6A, to define a gap of approximately constant maximum width therebetween.

In this position, the liquid freely flows through the annular passage 35 and enters the regulating chamber 34. As the pressure and volume of the regulating chamber increase, the diaphragm 29 displaces the valve member 15 toward the inlet fitting 5.

Figure 6C:
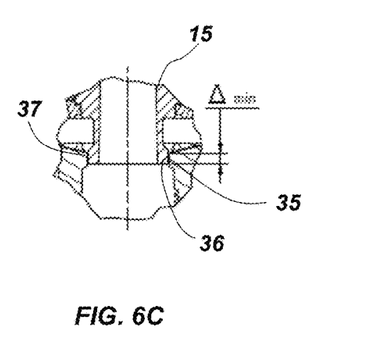
FIG. 6C is a view of the detail of FIG. 6A in the third operating step of FIG. 4C.

During this displacement, the two annular projections 36, 37 increasingly overlap, thereby reducing the width of the annular passage 35, until the two projections 36, 37 are in a fully facing and overlapped relationship, as shown in FIG. 6C.

In this position, the width of the annular passage has the minimum value $\Delta_{min}$, thereby reducing the section and the rising speed of the liquid in the regulating chamber 34. This lower speed makes the flow more laminar and less turbulent, thereby reducing the occurrence of water hammers and consequent vibrations.

Figure 7:
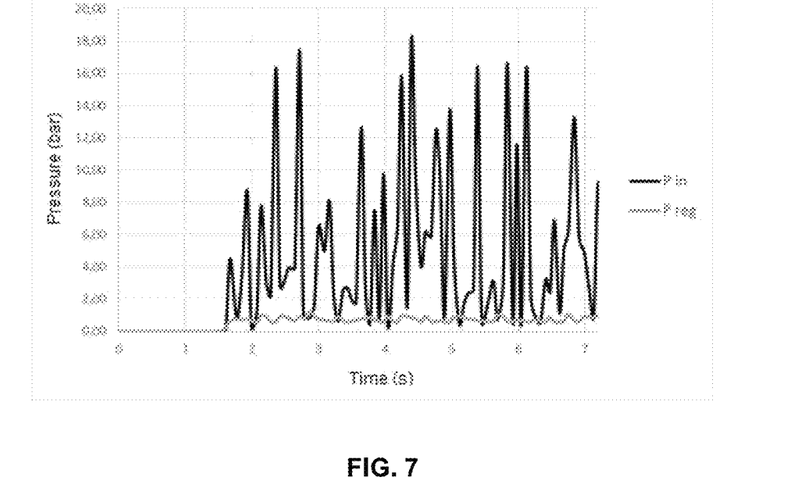
FIG. 7 is a chart of the inlet pressure $P_{inlet}$ and the outlet pressure $P_{outlet}$ of a regulator of the prior art as the supply line is initially opened.

FIG. 7 shows a first chart of the inlet pressure $P_{inlet}$ and the outlet regulated pressure $P_{outreg}$ of a regulator of the prior art, without the variable annular passage of the present invention.

Both pressures $P_{inlet}$ and $P_{outreg}$ are detected by means of suitable digital pressure gages from KELLER AG, for example at the inlet fitting a LEO 3/81040.1-30 gage having a measuring range from 0 to 30 bar and an output signal of 4-20 mA, and at the output fitting a LEO 3/4 bar/81040 manometer having a measuring range from 0 to 4 bar and an output signal of 4-20 mA. The output signals are processed by special software by KELLER AG.

In the case of FIG. 7, as soon as the circuit opens and the inflow of liquid from the supply line begins, the liquid passes through the tubular valve member and exits from the outlet fitting and, after reaching the nozzle, generates a back pressure that causes the liquid to rise through the outlet fitting and to abruptly enter at high speed into the regulating chamber.

This liquid entering in non-laminar form causes pressure peaks, the so-called water hammers, which are directly transferred to the regulating chamber. Thus, the liquid entering the regulating chamber with all its energy expands the diaphragm and causes it to abruptly move the valve member 15 toward the inlet portion 3 with a force that is higher than the reaction force of the spring. As a result, the inlet edge of the valve member is biased toward the valve seat, thereby occluding the inlet port.

As a result of this occlusion, the pressure in the regulating chamber drops and the spring abruptly biases the valve member toward the inlet fitting, while pressure rises in the regulating chamber and causes cyclical pressure changes and water hammers with pressure peaks of more than 18 bar.

Figure 8:
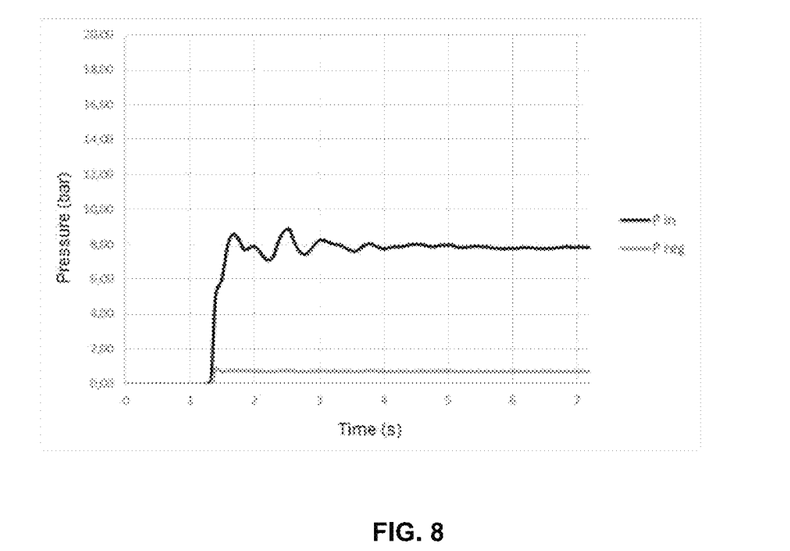
FIG. 8 is a diagram of the curve of the inlet pressure $P_{inlet}$ and the outlet pressure $P_{outlet}$ of a regulator of the invention as the supply circuit is initially opened.

FIG. 8 shows a chart of the inlet pressure $P_{inlet}$ and the nominal outlet regulated pressure $P_{outreg}$. Both pressures $P_{inlet}$ and $P_{outreg}$ are detected by sensors on a regulator with a variable annular passage according to the present invention.

Here, the liquid flow rises through the outlet fitting 6 toward the regulating chamber 34 in a much more gradual manner and without pressure peaks, thereby maintaining a stable regulated pressure, and the inlet flow pressure is also quickly stabilized due to the slow filling of the regulating chamber.

It shall be noted that the inlet pressure peaks never exceed 9 bar. In this case, a pressure of about 8 bar is available in the fluid supply line.

In a further aspect of the invention, the outlet portion 4 of the housing 2 has a wider region 38 joined to the outlet fitting 6, which wider region has an annular transverse surface 39 therein, defining the bottom of the regulating chamber 34.

Conveniently, the annular transverse surface 39 is inclined toward the center, to facilitate conveyance and discharge of any sand and impurities in the liquid collected in the chamber 34 to the outside at the end of the operation of the regulator, when the valve member 15 is biased by the spring 28 toward its maximum open position.

According to a further aspect, the inlet portion 3, the valve seat 14, the valve member 15 and the outlet portion 4 of the housing 2 may be coaxial with one another, as clearly shown in FIG. 2.

Nevertheless, the effect of the invention does not change in embodiments in which such elements have axes with parallel or angular offsets.

The method of operating the regulator of the invention comprises the following steps:

the liquid enters the inlet portion 3 of the housing 2;

the liquid flows into the valve member 15 after bypassing the valve body 12;

the liquid flows toward the downstream end 19 of the valve member;

part of the liquid flows back toward the regulating chamber 34 due to the downstream back pressure generated by a nozzle or a liquid delivery device;

the valve member 15 is displaced as the counteracting force $F_1$ of the spring 28 is exceeded and its inlet edge 18 moves toward the valve seat 14 to reduce the pressure of the liquid;

wherein the liquid flows back toward the regulating chamber 34 through the annular passage 35 of variable width $\Delta$, wherein said width $\Delta$ decreases as the inlet edge 18 of the valve member 15 moves toward the seat 14 to reduce the liquid flow toward the regulating chamber and avoid sudden pressure changes, vibrations and water hammers.

The liquid pressure regulator of the invention is susceptible to a number of changes and variants, within the inventive concept disclosed in the appended claims. All the details thereof may be replaced by other technically equivalent parts, and the materials may vary depending on different needs, without departure from the scope of the invention.

While the liquid pressure regulator has been described with particular reference to the accompanying figures, the numerals referred to in the disclosure and claims are only used for the sake of a better intelligibility of the invention and shall not be intended to limit the claimed scope in any manner.

INDUSTRIAL APPLICABILITY

The present invention may find application in industry because it can be produced on an industrial scale in factories manufacturing hydraulic parts for fluids or parts of irrigation systems.

The invention claimed is:

1. A coaxial liquid pressure regulator, comprising:
a housing defining a longitudinal axis and having an inlet portion and an outlet portion;
a substantially tubular valve member slidingly accommodated inside the housing and having an upstream end with an inlet edge;
a valve body fixed inside the housing and having a valve seat configured to interact with the inlet edge of the valve member and form therewith a port having a variable width;
an elastic annular diaphragm adapted to connect the valve member to the housing to form a regulating chamber therewith;
wherein the valve member, at a downstream end, has an outlet edge, the outlet edge being configured to interact with the outlet portion and form therewith an annular passage in communication with the regulating chamber;
wherein a width of the annular passage is variable and decreases as the inlet edge of the valve member moves toward the seat to reduce a liquid flow toward the regulating chamber and avoid sudden pressure changes, vibrations and water hammers;
wherein the outlet edge of the valve member has a first outer annular projection having a first diameter, and the outlet portion of the housing has a second inner annular projection having a second diameter which is greater than the first diameter, the annular passage having a width given by a difference of inner and outer diameters and by a position of the first annular projection relative to the second annular projection;

wherein the valve member is movable between a maximum open position when the inlet edge of the valve member is at a maximum distance from the valve seat with respect to the liquid flow demanded by a downstream distributor and a minimum open position with the inlet edge of the valve member at a minimum distance from the valve seat with respect to the liquid flow demanded by the downstream distributor; and wherein the annular passage has a maximum width with the inlet edge at the maximum distance and wherein the first annular projection and the second annular projection are fully axially offset to define a gap of approximately constant maximum width therebetween.

2. The coaxial liquid pressure regulator as claimed in claim 1, further comprising, inside the inlet portion of the housing, a substantially tubular sleeve with an annular collar having a calibrated hole for axially guiding the valve member.

3. The coaxial liquid pressure regulator as claimed in claim 2, wherein the valve member has a substantially radial flange adjacent to the outlet edge, a compression spring being interposed between the annular collar and the flange and peripherally surrounding the valve member to bias the valve member downstream.

4. The coaxial liquid pressure regulator as claimed in claim 3, wherein the annular diaphragm has an inner peripheral portion clamped to the flange and an outer peripheral edge clamped to the housing to define the regulating chamber.

5. The coaxial liquid pressure regulator as claimed in claim 4, wherein the outlet portion of the housing has a wider region with an annular transverse surface defining a bottom of the regulating chamber.

6. The coaxial liquid pressure regulator as claimed in claim 1, wherein the inlet portion, the valve seat, the valve member and the outlet portion of the housing are coaxial with one another.

7. The coaxial liquid pressure regulator as claimed in claim 1, wherein the inlet portion, the valve seat, the valve member and the outlet portion of the housing are angularly and/or transversely offset from one another.

8. A method of operating a liquid pressure regulator as claimed in claim 1, the method comprising the following steps:
   causing a liquid to enter the inlet portion of the housing;
   causing the liquid to flow into the valve member after bypassing the valve body;
   causing part of the liquid to flow back toward the regulating chamber due to a downstream back pressure generated by a nozzle or a liquid delivery device;
   causing the valve member to be displaced as a counteracting force of a spring is exceeded and the inlet edge moves toward the valve seat to reduce a pressure of the liquid;
   wherein the liquid flows back toward the regulating chamber through the annular passage of variable width; and
   wherein the width decreases as the inlet edge of the valve member moves toward the valve seat to reduce the flow toward the regulating chamber and avoid sudden pressure changes, vibrations and water hammers.

9. A coaxial liquid pressure regulator, comprising:
a housing defining a longitudinal axis and having an inlet portion and an outlet portion;
a substantially tubular valve member slidingly accommodated inside the housing and having an upstream end with an inlet edge;
a valve body fixed inside the housing and having a valve seat configured to interact with the inlet edge of the valve member and form therewith a port having a variable width;
an elastic annular diaphragm adapted to connect the valve member to the housing to form a regulating chamber therewith;
wherein the valve member, at a downstream end, has an outlet edge, the outlet edge being configured to interact with the outlet portion and form therewith an annular passage in communication with the regulating chamber;
wherein a width of the annular passage is variable and decreases as the inlet edge of the valve member moves toward the seat to reduce a liquid flow toward the regulating chamber and avoid sudden pressure changes, vibrations and water hammers;
wherein the outlet edge of the valve member has a first outer annular projection having a first diameter, and the outlet portion of the housing has a second inner annular projection having a second diameter which is greater than the first diameter, the annular passage having a width given by a difference of inner and outer diameters and by a position of the first annular projection relative to the second annular projection;
wherein the valve member is movable between a maximum open position when the inlet edge of the valve member is at a maximum distance from the valve seat with respect to the liquid flow demanded by a downstream distributor and a minimum open position with the inlet edge of the valve member at a minimum distance from the valve seat with respect to the liquid flow demanded by the downstream distributor; and
wherein the annular passage has a minimum width with the inlet edge at the minimum distance and wherein the first annular projection and the second annular projection are in a fully overlapping position to define a gap of minimum width therebetween, adapted to reduce the liquid flow in the regulating chamber and to avoid an occurrence of the water hammers and the vibrations inside the regulating chamber.

10. A coaxial liquid pressure regulator, comprising:
a housing defining a longitudinal axis and having an inlet portion and an outlet portion;
a substantially tubular valve member slidingly accommodated inside the housing and having an upstream end with an inlet edge;
a valve body fixed inside the housing and having a valve seat configured to interact with the inlet edge of the valve member and form therewith a port having a variable width;
an elastic annular diaphragm adapted to connect the valve member to the housing to form a regulating chamber therewith;
wherein the valve member, at a downstream end, has an outlet edge, the outlet edge being configured to interact with the outlet portion of the liquid and form therewith an annular passage in communication with the regulating chamber;
wherein a width of the annular passage is variable and decreases as the inlet edge of the valve member moves toward the seat to reduce a liquid flow toward the regulating chamber and avoid sudden pressure changes, vibrations and water hammers;

further comprising, inside the inlet portion of the housing, a substantially tubular sleeve with an annular collar having a calibrated hole for axially guiding the valve member;

wherein the valve member has a substantially radial flange adjacent to the outlet edge of the liquid, a compression spring being interposed between the annular collar and the flange and peripherally surrounding the valve member to bias the valve member downstream;

wherein the outlet portion of the housing has a wider region with an annular transverse surface defining a bottom of the regulating chamber; and wherein the annular transverse surface is inclined toward a center to facilitate conveyance and discharge of any sand and impurities collected in the regulating chamber to an outside at an end of an operation of the pressure regulator with the valve member biased by the compression spring to a maximum open position.

11. The coaxial liquid pressure regulator as claimed in claim 10, wherein the annular diaphragm has an inner peripheral portion clamped to the flange and an outer peripheral edge clamped to the housing to define the regulating chamber.

12. The coaxial liquid pressure regulator as claimed in claim 10, wherein the outlet edge of the valve member has a first outer annular projection having a first diameter, and the outlet portion of the housing has a second inner annular projection having a second diameter which is greater than the first diameter, the annular passage having a width given by a difference of inner and outer diameters and by a position of the first annular projection relative to the second annular projection.

13. The coaxial liquid pressure regulator as claimed in claim 12, wherein the valve member is movable between a maximum open position when the inlet edge of the valve member is at a maximum distance from the valve seat with respect to the liquid flow demanded by a downstream distributor and a minimum open position with the inlet edge of the valve member at a minimum distance from the valve seat with respect to the liquid flow demanded by the downstream distributor.

14. The coaxial liquid pressure regulator as claimed in claim 13, wherein the annular passage has a maximum width with the inlet edge at the maximum distance and wherein the first annular projection and the second annular projection are fully axially offset to define a gap of approximately constant maximum width therebetween.

* * * * *